UNITED STATES PATENT OFFICE.

FRANZ WEBEL, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

PRODUCING ISOPRENE.

1,083,165.   Specification of Letters Patent.   Patented Dec. 30, 1913.

No Drawing.   Application filed June 30, 1913.   Serial No. 776,550.

*To all whom it may concern:*

Be it known that I, FRANZ WEBEL, a citizen of the German Empire, residing at Ludwigshafen-on-the-Rhine, Germany, have invented new and useful Improvements in Producing Isoprene, of which the following is a specification.

I have found that I can obtain isoprene from isopropyl-acetylene by heating the latter with a contact substance consisting of or containing alumina, preferably under reduced pressure.

The following example will serve to illustrate further the nature of my invention, which, however, is not confined to this example: Lumps of alumina are introduced into a tube connected at one end with a dropping funnel and at the other end with a receiver cooled to about —80° C. and which also is connected to a vacuum pump. The apparatus is evacuated and the tube heated to about 400° C., isopropyl-acetylene of boiling point 28° C. is then allowed to drop into the tube in such a manner that a pressure of about from 40 to 50 millimeters is maintained. The isoprene which condenses in the receiver can be freed from any small quantities of isopropyl-acetylene by shaking with ammoniacal cuprous chlorid solution.

Now what I claim is:—

1. The process of producing isoprene by treating isopropyl-acetylene with a contact substance containing alumina at a raised temperature.

2. The process of producing isoprene by treating isopropyl-acetylene with a contact substance containing alumina at a raised temperature and under reduced pressure.

3. The process of producing isoprene by passing vaporized isopropyl-acetylene over a contact substance containing alumina at a temperature of about 400° C. and at a pressure of about 40 to 50 millimeters.

In testimony whereof I have hereunto set my hand in the presence of two subscribing witnesses.

FRANZ WEBEL.

Witnesses:
J. ALEC. LLOYD,
JOSEPH PFEIFFER.